United States Patent
Hsiao

(10) Patent No.: US 9,676,480 B2
(45) Date of Patent: Jun. 13, 2017

(54) FLYING MACHINE CAPABLE OF BLOCKING LIGHT AUTONOMOUSLY

(71) Applicant: Wen-Chang Hsiao, Taipei (TW)

(72) Inventor: Wen-Chang Hsiao, Taipei (TW)

(*) Notice: Subject to any disclaimer, the term of this patent is extended or adjusted under 35 U.S.C. 154(b) by 0 days.

(21) Appl. No.: 14/982,000

(22) Filed: Dec. 29, 2015

(65) Prior Publication Data

US 2016/0299504 A1    Oct. 13, 2016

(30) Foreign Application Priority Data

Apr. 10, 2015 (TW) ............................. 104111617 A

(51) Int. Cl.

| | | |
|---|---|---|
| B64C 39/00 | (2006.01) | |
| G05D 1/00 | (2006.01) | |
| B64C 39/02 | (2006.01) | |
| G05D 1/10 | (2006.01) | |
| B64C 27/06 | (2006.01) | |
| B64C 27/08 | (2006.01) | |

(52) U.S. Cl.
CPC ............ *B64C 39/024* (2013.01); *B64C 27/06* (2013.01); *B64C 27/08* (2013.01); *G05D 1/102* (2013.01); *B64C 2201/024* (2013.01); *B64C 2201/108* (2013.01); *B64C 2201/12* (2013.01); *B64C 2201/145* (2013.01); *Y02E 10/47* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,282,222 | B2* | 10/2012 | Smits ................... | G02B 26/101 353/85 |
| 8,301,326 | B2* | 10/2012 | Malecki ............... | G05D 1/0676 340/988 |
| 8,937,675 | B2* | 1/2015 | Noori ................. | H04M 1/72522 348/333.02 |
| 9,352,834 | B2* | 5/2016 | Davies ................... | G05D 1/102 |
| 9,412,278 | B1* | 8/2016 | Gong ................... | G08G 5/0039 |
| 9,454,154 | B1* | 9/2016 | Safarik ................ | G05D 1/0088 |
| 2014/0252156 | A1* | 9/2014 | Hiebl ......................... | B64C 3/30 244/3 |
| 2014/0324253 | A1* | 10/2014 | Duggan ............... | G05D 1/0061 701/3 |
| 2015/0041598 | A1* | 2/2015 | Nugent ................... | H02J 17/00 244/53 R |
| 2015/0160658 | A1* | 6/2015 | Reedman ............... | G05D 1/102 701/3 |
| 2015/0254738 | A1* | 9/2015 | Wright, III ......... | G06Q 30/0284 705/26.81 |
| 2016/0041266 | A1* | 2/2016 | Smits ...................... | G01S 17/66 356/5.01 |

\* cited by examiner

*Primary Examiner* — Yonel Beaulieu

(57) ABSTRACT

A flying machine capable of blocking light autonomously includes a machine body with a flight direction control module, a light sensor for detecting a sunshine angle, a position sensor for detecting the position of a moving object, and a flight movement adjuster to control the machine body to autonomously fly to a position linearly aligned with the sunlight and the moving object, so that the flying machine blocks between the sunlight and the moving object.

10 Claims, 4 Drawing Sheets

FLYING MACHINE CAPABLE OF BLOCKING LIGHT AUTONOMOUSLY

TECHNICAL FIELD

The technical field relates to a flying machine capable of blocking light autonomously, and more particularly to a single-rotor or multi-rotor copter capable of detecting the positions of the sun and a moving object and autonomously flying to a position linear to the sunlight and the moving object.

BACKGROUND

Many activities, jobs and researches have to take place in an environment without direct sunlight. For example, if light is projected directly onto an athlete during a ball game or a shooting sport, the projected light will affect the athlete's vision or will cause errors and affect results, or light is projected directly onto an actor/actress or a model while shooting a film or a static photography, the photographic effect may be affected easily, or sunlight is projected directly onto an experiment (which must be exposed to the natural environment) in a scientific research, the experiment may fail due to the direct sunlight. However, a common way to solve this problem is to build scaffoldings or hold a reflective panel by hands in order to block the direct projection of light, which may waste time and effort and cause tremendous inconvenience to its use. In addition, workers such as farmers, fishermen, and construction workers may get a heat stroke through the exposure to the hot sun while farming, fishing, or doing an outdoor construction work, and thus requiring shading.

Further, the single-rotor or multi-rotor copter has the features of high flight stability, lightweight, and low cost. Due to the mature technology, these flying machines have been used extensively in recent years in various different areas such as aerial photography, traffic monitoring, rescue, and even recreation. In view of this trend, the discloser of this disclosure based on years of experience in the related industry to conduct researches and experiments, and finally developed a single-rotor or multi-rotor copter to autonomously block light and provide a feasible solution to fulfill the aforementioned needs.

SUMMARY

Therefore, it is a primary objective of this disclosure to provide a flying machine capable of blocking light autonomously, particularly a single-rotor copter or a multi-rotor copter capable of automatically detecting the positions of a sunshine angle and a moving object and autonomously flying to a position aligned linearly with the sunlight and the moving object. This disclosure overcomes the shortcomings of the prior art and provides a flying machine capable of autonomously blocking light without requiring to build scaffoldings or hold a reflective panel by hands in order to block a direct projection of light, which may waste time and effort and cause tremendous inconvenience to its use.

To achieve the aforementioned and other objective, this disclosure provides a flying machine capable of blocking light autonomously, comprising:

a machine body, at least one rotor module installed at the top of the machine body and capable of driving the machine body to fly, and a flight direction control module installed to the machine body and capable of controlling the rotor module, and the machine body including a light sensor for detecting a sunshine angle, a position sensor for detecting the position of a moving object, and a flight movement adjuster capable of driving the flight direction control module to control the machine body to fly to a position aligned linearly with the moving object and the sunlight according to parameters detected by the light sensor and the position sensor.

While the machine body is flying, the light sensor keeps sensing the relative angle between the machine body and the sunlight to detect a light parameter. In the meantime, the position sensor keeps sensing a relative angle between the machine body and the moving object to detect a position parameter, and the light parameter and the position parameter detected by the light sensor and the position sensor respectively are transmitted to the flight movement adjuster, and the flight movement adjuster controls the flight direction control module according to the light parameter and the position parameter, so that the flight direction control module drives the rotor module to release the machine body from a manual control and to autonomously fly to a position aligned linearly with the moving object and the sunlight.

Wherein, the machine body is actively controlled by the flight movement adjuster to fly to a position aligned linearly with the moving object and the sunlight, quickly and precisely so as to achieve the effects of quick determination and response time, and the functions of fully automatic detection and operation, and the application saves time and effort and features convenient operation. This flying machine achieves the effects of automatically detecting the positions of the sun and the moving object and autonomously flying to a position linearly with the sunlight and the moving object.

Specific embodiments of this disclosure are described in details as follows:

According to the aforementioned characteristics of the flying machine, the rotor module includes one module installed at the top of the middle of the machine body to form a single-rotor copter, or a plurality of modules installed at the periphery of the top of the machine body to form a multi-rotor copter.

According to the aforementioned characteristics of the flying machine, the position sensor is installed at the bottom of the machine body, and the light sensor is installed at the top of the machine body.

According to the aforementioned characteristics of the flying machine, the position sensor is an image identifier or an infrared identifier, or the moving object includes a transmitter of a position signal, and the position sensor is a receiver of the position signal.

According to the aforementioned characteristics of the flying machine, the machine body includes a shutter, so that when the machine body flies to a position aligned linearly with the moving object and the sunlight, the shutter provides a shading effect.

According to the aforementioned characteristics of the flying machine, the shutter is a solar panel to provide a shading effect and an effect of converting solar energy into electric energy concurrently.

According to the aforementioned characteristics of the flying machine, the rotor module includes a motor installed onto the machine body, and a rotor blade driven by the motor.

According to the aforementioned characteristics of the flying machine, the flight direction control module is in form of a circuit board, and the flight direction control module includes a flight controller, an angular velocity sensor and an electronic speed governor, and the flight controller includes a microcontroller (MCU) installed thereon, and the flight controller is electrically coupled to the angular velocity sensor and the electronic speed governor, and the electronic speed governor is electrically coupled to the rotor module.

According to the aforementioned characteristics of the flying machine, the flight direction control module includes an acceleration sensor, a gyroscope, an electronic compass, a barometer, an ultrasonic sensor and/or a GPS sensor.

According to the aforementioned characteristics of the flying machine, the machine body includes a battery, a camera, a wireless video transmission module and a wireless remote control module, and the battery, camera, the wireless video transmission module and the wireless remote control module are electrically coupled to the flight direction control module.

This disclosure will become clearer in light of the following detailed description of an illustrative embodiment of this invention described in connection with the drawings.

DESCRIPTION OF THE PREFERRED EMBODIMENTS

Figure 1:
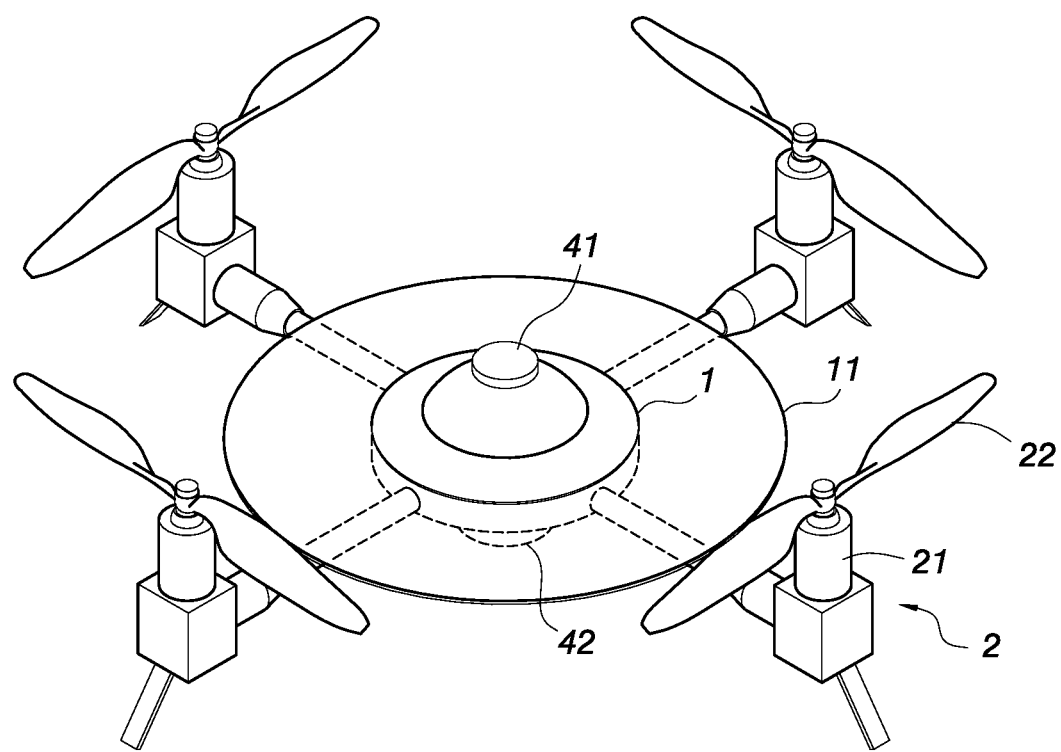
FIG. 1 is a perspective view of a preferred embodiment of this disclosure.

The technical content of this disclosure will become apparent with the detailed description of preferred embodiments and the illustration of related drawings as follows.

With reference to FIGS. 1 to 4 for a flying machine capable of blocking light autonomously in accordance with a preferred embodiment of this disclosure, the flying machine comprises a machine body 1, at least one rotor module 2 and a flight direction control module 3, wherein the rotor module may be a single set installed at the top of the middle of the machine body 1 to form a single-rotor copter, or it includes a plurality of sets installed at the periphery of the top of the machine body 1 to form a multi-rotor copter. The figures just show a multi-rotor copter only, and each rotor module 2 is installed at the periphery of the machine body 1 and provided for driving the machine body 1 to fly.

The flight direction control module 3 is installed in the machine body 1 and electrically coupled to the rotor module 2, so that the flight direction control module 3 can control the operation of the rotor module 2 and drive the machine body 1 to fly.

In a preferred embodiment, the machine body 1 comprises a light sensor 41, a position sensor 42, and a flight movement adjuster 40, and the light sensor 41 is installed at the top of the machine body 1 and capable of detecting a sunshine angle of the sun 9, and the position sensor 42 is installed at the bottom of the machine body 1 and capable of detecting the position of a moving object 8, wherein the moving object 8 may be a person, an animal, a motor vehicle, or a moving mechanical equipment.

Specifically, the position sensor 42 may be an image identifier or an infrared identifier; or a transmitter 421 (such as a Smartwatch) may be installed to the moving object 8 for transmitting a position signal, and the position sensor 42 may be a receiver 420 of the position signal.

Figure 4:
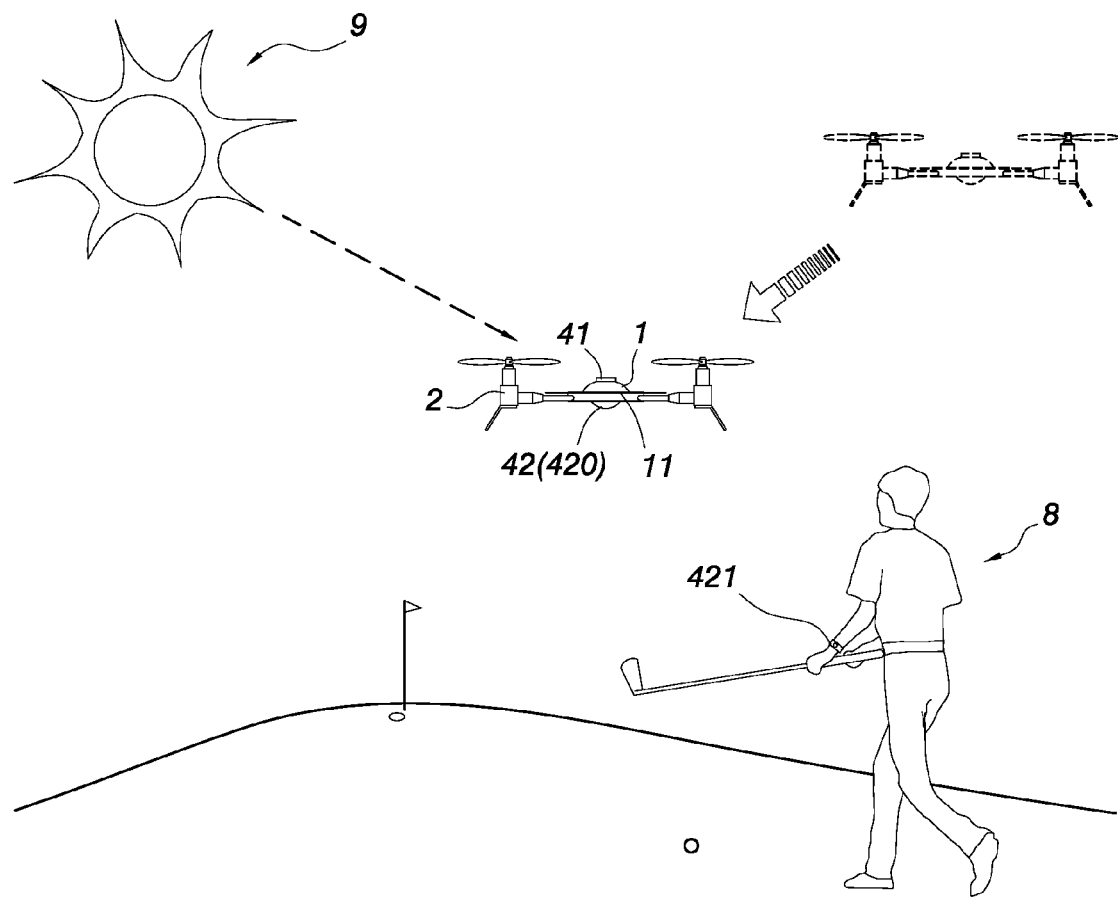
FIG. 4 is a schematic view of another using status of the preferred embodiment as depicted in FIG. 3.

The flight movement adjuster 40 can drive the flight direction control module 3 to control the machine body 1 as shown in FIG. 4 to fly to a position aligned linearly with the moving object 8 and the sun 9 according to the parameters detected by the light sensor 41 and the position sensor 42.

In a feasible embodiment, the machine body 1 has a shutter 11, so that when the machine body 1 has flown to a position linearly aligned with the moving object 8 and the sun 9, the shutter 11 provides a shading effect. In an implementation, the shutter 11 is a solar panel to provide the effects of shading the sun and converting solar energy into electric energy concurrently to improve the flight endurance of the flying machine.

Figure 2:
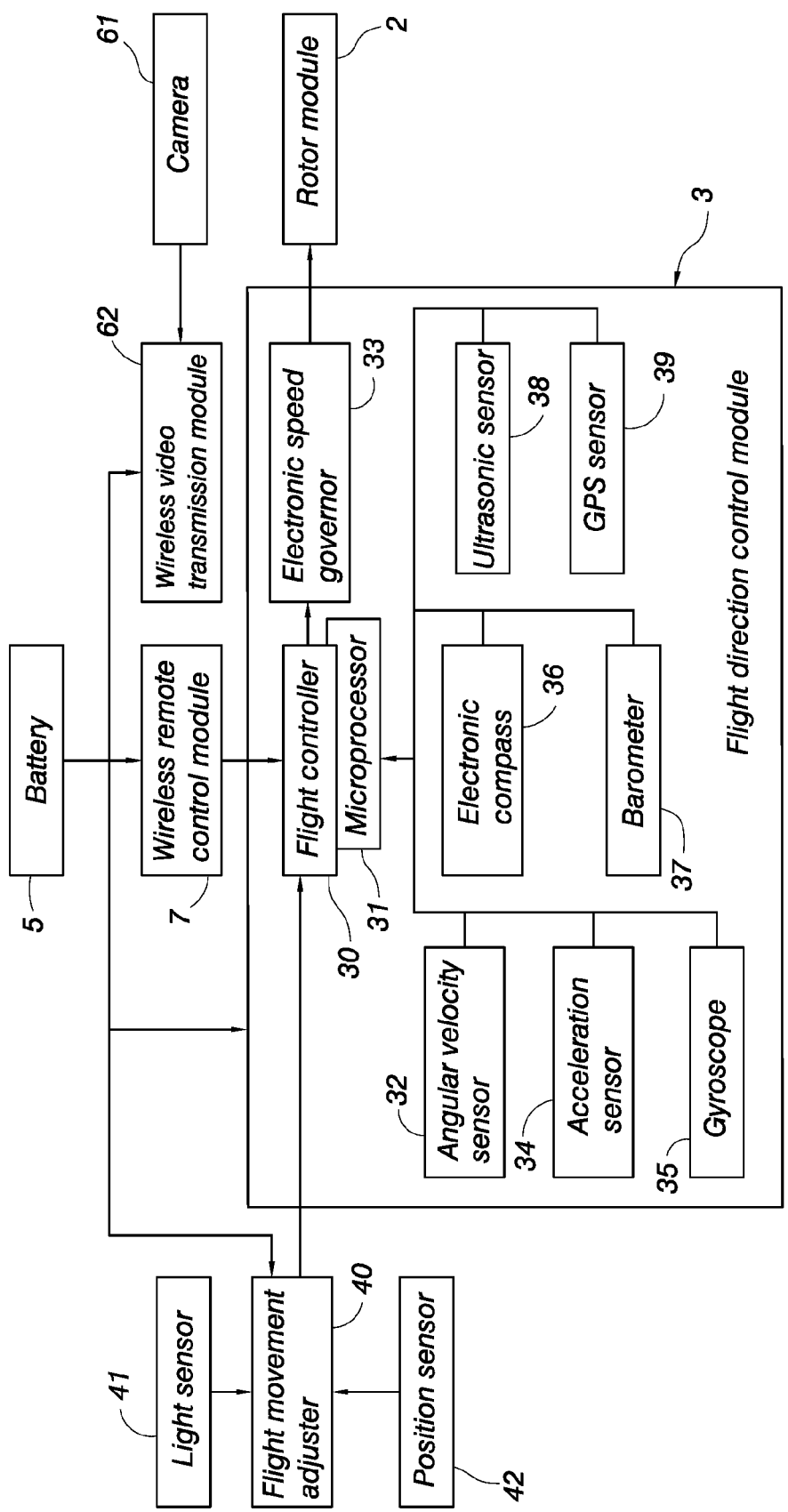
FIG. 2 is a functional block diagram of a preferred embodiment of this disclosure.

In FIGS. 1 and 2, the rotor module 2 includes a motor 21 installed to the machine body 1, and a rotor blade 22 driven by the motor 21, wherein the motor 21 is a brushless DC motor.

The flight direction control module 3 is in form of a circuit board and includes a flight controller 30, an angular velocity sensor 32 and an electronic speed governor 33, and the flight controller 30 has a microprocessor 31(MCU) and is electrically coupled to the angular velocity sensor 32 and the electronic speed governor 33, and the electronic speed governor 33 is electrically coupled to the brushless DC motor (motor 21) of the rotor module 2.

In addition, the flight direction control module 3 further includes an acceleration sensor 34, a gyroscope 35, an electronic compass 36, a barometer 37, an ultrasonic sensor 38 and/or a GPS sensor 39, and the acceleration sensor 34, the gyroscope 35, electronic compass 36, the barometer 37, the ultrasonic sensor 38 and the GPS sensor 39 are electrically coupled to the flight controller 30.

Specifically, the flight direction control module 3 is a primary control unit of the flying machine, and the flight controller 30 reads the parameters detected by the angular velocity sensor 32 and the acceleration sensor 34 calculates the actual attitude and angle of the machine body 1 according to such parameters to control each motor 21 to output different rotating speeds, so as to achieve the effect of controlling the flight attitude of the machine body 1.

The angular velocity sensor 32 is provided for detecting a change of angle of the machine body 1 in a specific time to control the flight stability of the machine body 1. The acceleration sensor 34 is provided for measuring an acceleration of the flight of the machine body 1 to detect a change of gravity. In addition, the acceleration sensor 34 and the gyroscope 35 are provided for collecting a pitch rate, a roll rate, and a yaw rate of the machine body 1, and the acceleration sensor 34 is provided for compensating the temperature drift produced by the gyroscope 35.

The electronic compass 36 is provided for sensing the geomagnetic field to detect the direction and position of the machine body 1. The barometer 37 is provided for detecting a change of atmospheric pressure to detect the flight altitude of the machine body 1. The ultrasonic sensor 38 uses a sound wave to detect an obstacle such as a building or a tree above ground, or a ground distance, so that the machine body 1 can avoid hitting the obstacle and achieve an automatic landing function. The GPS sensor 39 is provided for achieving a GPS positioning flight. With the GPS positioning, the flying machine knows where it is. The electronic speed governor 33 is controlled by the flight direction control module 3 to adjust the rotating speed of the motor 21 of each rotor module 2.

In addition, the machine body 1 includes a battery 5, a camera 61, a wireless video transmission module 62 and a wireless remote control module 7, and the battery 5, the camera 61, the wireless video transmission module 62 and the wireless remote control module 7 are electrically coupled to the flight direction control module 3.

Figure 3:
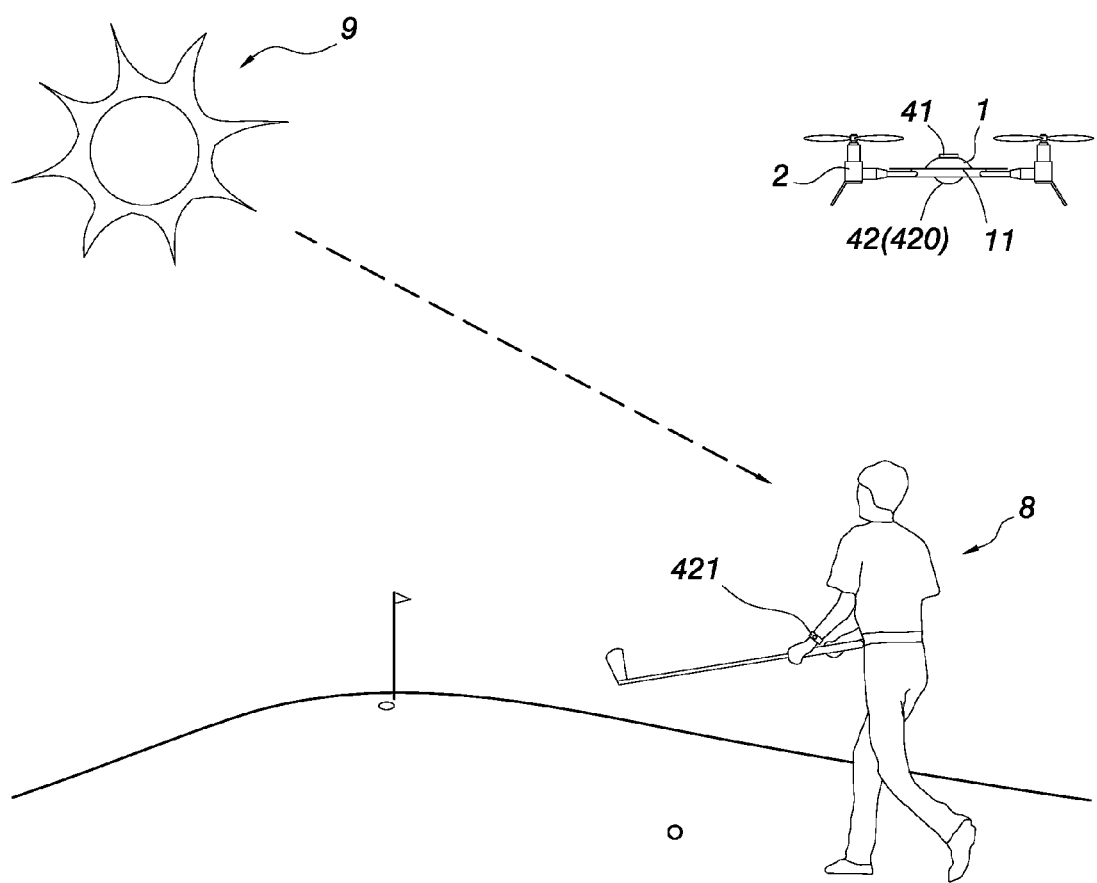
FIG. 3 is a schematic view of a using status of the preferred embodiment of this disclosure as depicted in FIG. 1.

In FIGS. 2 to 4, while the machine body 1 is flying, the light sensor 41 keeps sensing the relative angle between the machine body 1 and the sun 9 to detect and measure a light parameter. In the meantime, the position sensor 42 keeps sensing the relative angle between the machine body 1 and the moving object 8 to detect and measure a position parameter, and the light parameter and the position parameter detected by the light sensor 41 and the position sensor 42 are transmitted to the flight movement adjuster 40, and the flight movement adjuster 40 controls the flight direction control module 3 according to the light parameter and the position parameter, so that the flight direction control module 3 drives the rotor module 2 to release the machine body 1 from the manual control and autonomously fly the machine body 1 to a position aligned linearly with the moving object 8 and the sun 9.

Therefore, the machine body 1 can fly to a position aligned linearly with the moving object 8 and the sun 9 quickly and precisely through the active control by the flight movement adjuster 40, and the determination and response time is very fast, and the flying machine 1 has the effects of providing fully automatic detecting and operating functions, saving time and effort, and giving a convenient operation, so as to achieve the aforementioned effects of automatically detecting the positions of the sun 9 and the moving object 8 and autonomously flying to a position aligned linearly with the sun 9 and the moving object 8. This disclosure overcomes the shortcomings of the prior art and provides a flying machine capable of autonomously blocking light without requiring to build scaffoldings or raise a reflective panel by hands in order to block a direct projection of light, which may waste time and effort and cause tremendous inconvenience to its use.

While the invention is described in detail with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

2 Rotor module
3 Flight direction control module
30 Flight controller
31 Microprocessor
32 Angular velocity sensor
33 Electronic speed governor
34 Acceleration sensor
35 Gyroscope
36 Electronic compass
37 Barometer
38 Ultrasonic sensor
39 GPS sensor
40 Flight movement adjuster
41 Light sensor
42 Position sensor
5 Battery
61 Camera
62 Wireless video transmission module
7 Wireless remote control module

What is claimed is:

1. A flying machine configured to autonomously block sunlight for a moving object, the flying machine comprising:
    a machine body comprising:
       a light sensor for detecting an angle of the sunlight; and
       a position sensor for detecting a position of the moving object;
    at least one rotor module installed on the machine body and configured to drive the machine body for flight, and
    a flight direction control module installed on the machine body and configured to control the rotor module,
    wherein the flying machine further comprises a flight movement adjuster coupled to the light sensor, the position sensor and the flight direction control module, the flight movement adjuster configured to utilize the light sensor and the position sensor to control the flight direction control module to cause the machine body to fly to a position aligned linearly with the moving object and the sunlight according to parameters detected by the light sensor and the position sensor to shade the moving object from the sunlight.

2. The flying machine according to claim 1, wherein the rotor module includes one module installed at a top of a middle of the machine body to form a single-rotor copter, or a plurality of modules installed at a periphery of the top of the machine body to form a multi-rotor copter.

3. The flying machine according to claim 1, wherein the machine body includes a shutter or a solar panel installed thereon.

4. The flying machine according to claim 1, wherein the light sensor is installed at a top of the machine body.

5. The flying machine according to claim 4, wherein the position sensor is an image identifier or an infrared identifier installed at a bottom of the machine body.

6. The flying machine according to claim 4, wherein the moving object includes a transmitter of a position signal installed thereon, and the position sensor is a receiver of the position signal.

7. The flying machine according to claim 1, wherein the rotor module includes a motor installed onto the machine body, and a rotor blade driven by the motor.

8. The flying machine according to claim 1, wherein the flight direction control module includes a flight controller, an angular velocity sensor and an electronic speed governor, and the flight controller includes a microcontroller installed thereon, and the flight controller is electrically coupled to the angular velocity sensor and the electronic speed governor, and the electronic speed governor is electrically coupled to the rotor module.

9. The flying machine according to claim 8, wherein the flight direction control module further includes one or more of an acceleration sensor, a gyroscope, an electronic compass, a barometer, an ultrasonic sensor and a GPS sensor.

10. The flying machine according to claim 1, wherein the machine body includes a battery, a camera, a wireless video transmission module and a wireless remote control module, and the battery, camera, the wireless video transmission module and the wireless remote control module are electrically coupled to the flight direction control module.

* * * * *